(12) United States Patent
Song et al.

(10) Patent No.: US 11,506,170 B1
(45) Date of Patent: Nov. 22, 2022

(54) GENERATOR DEVICE USING POTENTIAL ENERGY

(71) Applicant: Shenzhen Yibo Science and Technology Ltd., Guangdong (CN)

(72) Inventors: Shujiang Song, Guangdong (CN); Yi Song, Guangdong (CN)

(73) Assignee: Shenzhen Yibo Science and Technology Ltd., Shenzhen (CN)

( * ) Notice: Subject to any disclaimer, the term of this patent is extended or adjusted under 35 U.S.C. 154(b) by 0 days.

(21) Appl. No.: 17/382,367

(22) Filed: Jul. 22, 2021

(30) Foreign Application Priority Data

Jun. 9, 2021 (CN) .......................... 202110640960.4

(51) Int. Cl.
*F03B 13/10* (2006.01)
*F03B 13/20* (2006.01)
*F03B 13/26* (2006.01)

(52) U.S. Cl.
CPC .............. *F03B 13/10* (2013.01); *F03B 13/20* (2013.01); *F03B 13/26* (2013.01); *Y02E 10/20* (2013.01)

(58) Field of Classification Search
CPC .......... F03B 13/10; F03B 13/20; F03B 13/26; Y02E 10/20
USPC ................ 60/497–500, 505–507; 290/42, 53
See application file for complete search history.

(56) References Cited

U.S. PATENT DOCUMENTS

| | | | | |
|---|---|---|---|---|
| 2,730,631 A | * | 1/1956 | Dandini | F03B 17/063 417/313 |
| 4,239,976 A | * | 12/1980 | Collard | H02K 7/1823 290/53 |
| 9,617,972 B1 | | 4/2017 | Skaf | |
| 2018/0003086 A1 | * | 1/2018 | Miller | F01K 25/08 |
| 2018/0245563 A1 | | 8/2018 | Wadhuta | |

FOREIGN PATENT DOCUMENTS

| | | |
|---|---|---|
| CN | 201474842 U | 5/2010 |
| CN | 102251913 A | 11/2011 |
| CN | 102878005 A | 1/2013 |
| CN | 103590968 A | 2/2014 |
| CN | 103807086 B | 4/2016 |
| CN | 106150851 A | 11/2016 |
| CN | 106337771 A | 1/2017 |

(Continued)

OTHER PUBLICATIONS

Extended European Search Report of counterpart European Application No. 21190939.5 dated Jan. 19, 2022.

*Primary Examiner* — Hoang M Nguyen (57) ABSTRACT

Disclosed is a generator device using potential energy, relating to the field of new technologies. The generator device using potential energy includes a ball buoy and connecting rods, the ball buoy includes a casing, flywheels, a transmission gear and generators, the flywheel, the transmission gear and the generators are located inside the casing. A generator gear is provided on a rotary shaft of each of the generators, the transmission gear is provided with external teeth and internal teeth, and the generator gear is engaged with the internal teeth, and the flywheels are engaged with the external teeth. The connecting rods are each connected with one of the flywheels inside the casing through a rotating shaft arranged on the casing, and the flywheels are driven to rotate in one direction by the connecting rods through the rotating shaft.

18 Claims, 10 Drawing Sheets

(56) References Cited

FOREIGN PATENT DOCUMENTS

| | | |
|---|---|---|
| CN | 206722959 U | 12/2017 |
| CN | 108301962 A | 7/2018 |
| CN | 109139345 A | 1/2019 |
| CN | 110486214 A | 11/2019 |
| DE | 102014102557 A1 | 8/2015 |
| GB | 297720 A | 9/1928 |

* cited by examiner

GENERATOR DEVICE USING POTENTIAL ENERGY

CROSS-REFERENCE TO RELATED APPLICATION

The present application claims priority from Chinese patent application No. 202110640960.4 filed on Jun. 9, 2021, and claims its priority. The entire disclosure of the application is incorporated herein by reference in its entirety.

FIELD OF TECHNOLOGY

The present application relates to the technical field of new energy, in particular to a generator device using potential energy of ocean waves.

BACKGROUND TECHNOLOGY

New energy is based on new technologies and new materials, so that traditional renewable energy can be developed and utilized in a modernized way. Exhaustible and polluting fossil energy can be replaced by inexhaustible and recurring renewable energy, such as solar energy, wind energy, biomass energy, tidal energy, geothermal energy, hydrogen energy and nuclear energy, and the like. With the problems of reserves and environment impact of conventional energy sources, new energy which is environmental friendly and renewable has attracted increasing attention from various countries. The development of the new energy industry is not only an effective supplement to the energy supply system, but also an important measure for environmental management and ecological protection, and is the ultimate energy choice for sustainable development of human society.

In recent years, ocean-related new energy technologies, such as wave energy, ocean current energy and tidal energy, as well as the thermal cycle between the ocean surface and the deep layer, have been initially developed, but are still under active research and development without large scale application.

As disclosed in CN201110172753, an ocean wave generator device, comprising: a first buoy, a first flared opening, a second flared opening, and a generator component, the first flared opening and second flared opening are respectively disposed on two sides of the generator component and are, along with the generator component, fixed to the first buoy; ocean wave water passes via one flared opening to the generator component, and then flows via the generator component to the other flared opening. The ocean wave generator system utilizes the lateral kinetic and potential energy as well as the undulating vertical kinetic and potential energy of ocean waves, in combination with the diffraction principles of waves, to generate power by the large-scale harnessing of the ocean waves that rush inward along the coastline.

CN201811157125 disclosed a wave power generation device having a plurality floating barrels, a plurality of hydraulic cylinders and a water turbine loaded with a generator; the floating barrels and piston rods of the hydraulic cylinders are correspondingly fixed to floating body fixing piles through cross beams; water inlets and water outlets are formed in the hydraulic cylinders; and the water outlets are connected with water pipes, and sea water is poured into the water turbine through the water pipes. The wave power generation device solves the technical problem of low wave utilization rate existing in the prior art.

CN201210375326 disclosed a wave-activated generator, which comprises a wave power acquirer and an induced motor. The wave power acquirer is made of an inflatable rubber capsule, and a silicon steel sheet reinforcing frame is inlaid in the wall of the inflatable rubber capsule. The inflatable rubber capsule is composed of an upper half and a lower half and is shaped by inside and outside gas pressure difference. The induced motor comprises a central shaft, a permanent magnet pole, a rolling bearing, a pendulum bob and a generating coil. The pendulum bob is capable of driving the central shaft and the generating coil to relatively rotate so as to generate current.

CN201310590646 disclosed a seacoast sea-wave electric generator and an ocean sea-wave electric generator. Floating plates or floaters which float on sea waves and the sea waves flow up and down synchronously; when the floating plates or the floaters and the sea waves flow up and down synchronously, pistons in sealed cabins are driven to move, and high-pressure air is produced and discharged by the sealed cabins; thus, turbine engines connected with the sealed cabins are driven to collect the high-pressure air and rotate to generate electricity, and kinetic energy of the sea waves is used for generating the electricity.

The above-mentioned existing technologies that utilize ocean wave energy all require complex technologies and expensive costs.

SUMMARY

An objective of the present application is to provide a technology for converting potential energy into electrical energy, in particular to the conversion utilizing undulating potential energy of ocean waves, and the present application is achieved by technical proposals as follows.

A generator device using potential energy, which includes a ball buoy and connecting rods, the ball buoy includes a casing, flywheels, a transmission gear and generators, the flywheel, the transmission gear and the generators are located inside the casing. A generator gear is provided on a rotary shaft of each of the generators, the transmission gear is provided with external teeth and internal teeth, and the generator gear is in engagement with the internal teeth, and the flywheels are in engagement with the external teeth. The connecting rods are each connected with one of the flywheels inside the casing through a rotating shaft arranged on the casing, and the flywheels are driven to rotate in one direction by the connecting rods through the rotating shaft.

Further, the transmission gear includes a driven wheel and a driven wheel internal gear fixed on the driven wheel, the external teeth are provided on the driven wheel, and the internal teeth are provided on the driven wheel internal gear.

Further, the rotating shaft includes a flywheel bearing and a flywheel shaft, with the flywheel bearing fixed on the casing and sleeved on the flywheel shaft, the flywheel and the connecting rod are respectively fixed on two ends of the flywheel shaft. Specifically, the center of the flywheel is connected to one end of the flywheel shaft, and an end portion of the connecting rod is connected to the other end of the flywheel shaft. Furthermore, the connecting rod is perpendicularly connected with the flywheel shaft.

Preferably, a ratchet and a pawl which are matched with the ratchet are provided inside the flywheels, and the flywheel shaft is connected with the pawl, so that the flywheel is rotated in a single direction through the ratchet and the pawl, which ensures the transmission gear is rotated in a single direction thereby driving the generators to generate electricity.

Preferably, the casing has a spherical shape, which withstands the impact of waves evenly.

Further, a spherical frame is located inside the casing, the spherical frame is formed by a plurality of circular or semicircular rings, and an outer diameter of the circular or semicircular rings is the same as an inner diameter of the casing in order to increase the rigidity of the casing.

Preferably, a fixed frame is provided on the spherical frame, and the transmission gear and the generators are arranged on the fixed frame.

Preferably, the number of the generators is at least two.

Preferably, the number of the connecting rods is at least two, and each of the connecting rods corresponds to one of the flywheels engaged with the external teeth. Furthermore, the connecting rods are arranged along tangential directions of surface of the spherical casing.

Preferably, width of the connecting rods gradually increases from the end portion to a middle portion thereof, and a cross section of the connecting rods gradually narrows from top to bottom. The connecting rods are preferably made of rigid materials with a density lower than that of seawater.

Preferably, the number of the connecting rods is three or four.

Preferably, both ends of the connecting rods are connected with the ball buoy.

In the generator device using potential energy of the present application, the flywheels are driven to rotate by the connecting rods through the rotating shaft utilizing the undulating potential energy of the waves, which then drives the transmission gear to rotate the generators to generate electricity. Furthermore, the flywheels are designed to only rotate in one direction so that the transmission gear is also rotated in one direction to drive the generators to generate electricity.

BRIEF DESCRIPTION OF THE DRAWINGS

In order to more clearly illustrate the technical proposals of the present application, the drawings used in the embodiments will be briefly described below. Apparently, the drawings in the following description are merely some embodiments of the present application, those skilled in the art can obtain other drawings based on these drawings without creative work.

REFERENCE SIGNS

1—ball buoy, 2—connecting rod, 21—rod body, 22—square hole, 3—rotating shaft, 31—flywheel shaft, 311—square column, 32—flywheel bearing, 33—flywheel bearing cover, 4—flywheel, 41—flywheel teeth, 42—pawl, 43—ratchet, 44—flywheel lower cover, 45—flywheel upper cover, 5—driven wheel, 51—external teeth, 52—mounting hole, 53—driven wheel bearing, 54—bearing cover, 6—driven wheel internal gear, 61—internal teeth, 7—spherical frame, 71—bearing hole, 72—fixed frame, 721—generator mounting base, 722—driven wheel mounting base, 73—first ring, 74—second ring, 75—third ring, 8—generator, 81—rotary shaft, 82—generator gear.

DETAILED DESCRIPTION OF THE EMBODIMENTS

The technical proposals in the embodiments of the present application will be clearly and completely described in conjunction with the accompanying drawings in the embodiments of the present application. It is apparent that the described embodiments are merely part of the embodiments of the present application rather than all embodiments. Based on the embodiments of the present application, all other embodiments obtained by those skilled in the art without creative work fall within the scope of protection of the present application.

It should be understood that, when used in this specification and the appended claims, the terms "include" and "comprise" indicate the presence of the described features, integers, steps, operations, elements and/or components, but do not preclude the presence or addition of a plurality of other features, integers, steps, operations, elements, components, and/or collections thereof.

It should also be understood that the terms used in this description of the present application is merely illustrative of the specific embodiments, but not intended to limit the scope of the present application. It should be further understood that the term "and/or" used in the specification and appended claims of the present application refers to any combination of one or more of the items listed in the associated and all possible combinations, and includes these combination.

Embodiment 1

Figure 1:
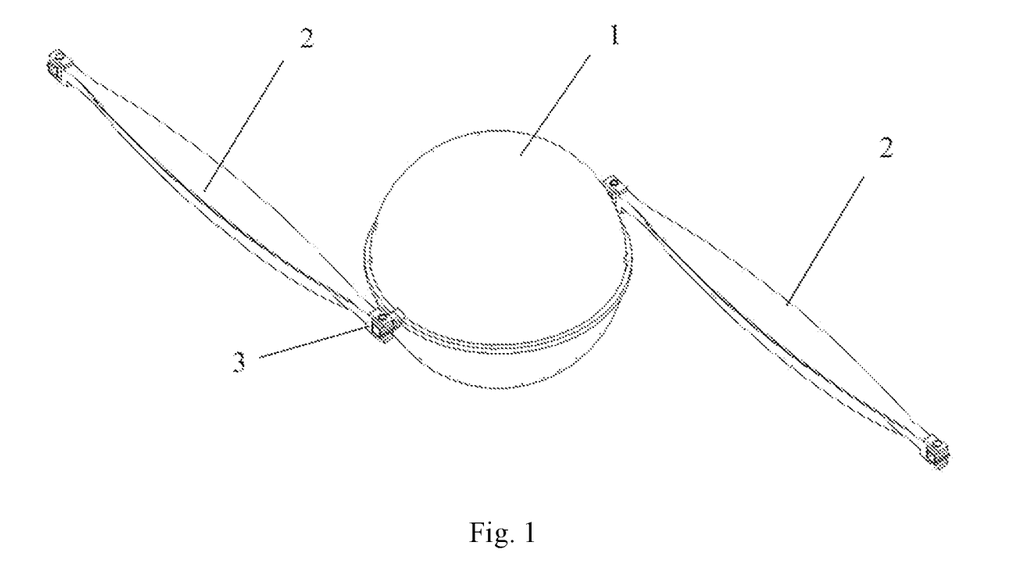
FIG. 1 is a structural view of the generator device using potential energy with two connecting rods according to Embodiment 1 of the present application.

Referring to FIG. 1, FIG. 1 shows a generator device using potential energy provided by the present embodiment which, in particular, is a generator device using potential energy having two connecting rods. The generator device includes a ball buoy 1, connecting rods 2, and rotating shafts 3. The number of the connecting rods 2 is two, and the two connecting rods 2 are arranged on opposite sides of the ball buoy 1. Each connecting rod 2 is arranged along the tangential direction of the surface of the ball buoy 1, with one end connected to the ball buoy 1 through a rotating shaft 3. Two rotating shafts 3 are evenly distributed on the same surface in a radial direction of the ball buoy 1, that is, an angle between the two rotating shafts 3 towards the center of the ball buoy 1 is 180°.

Figure 2:
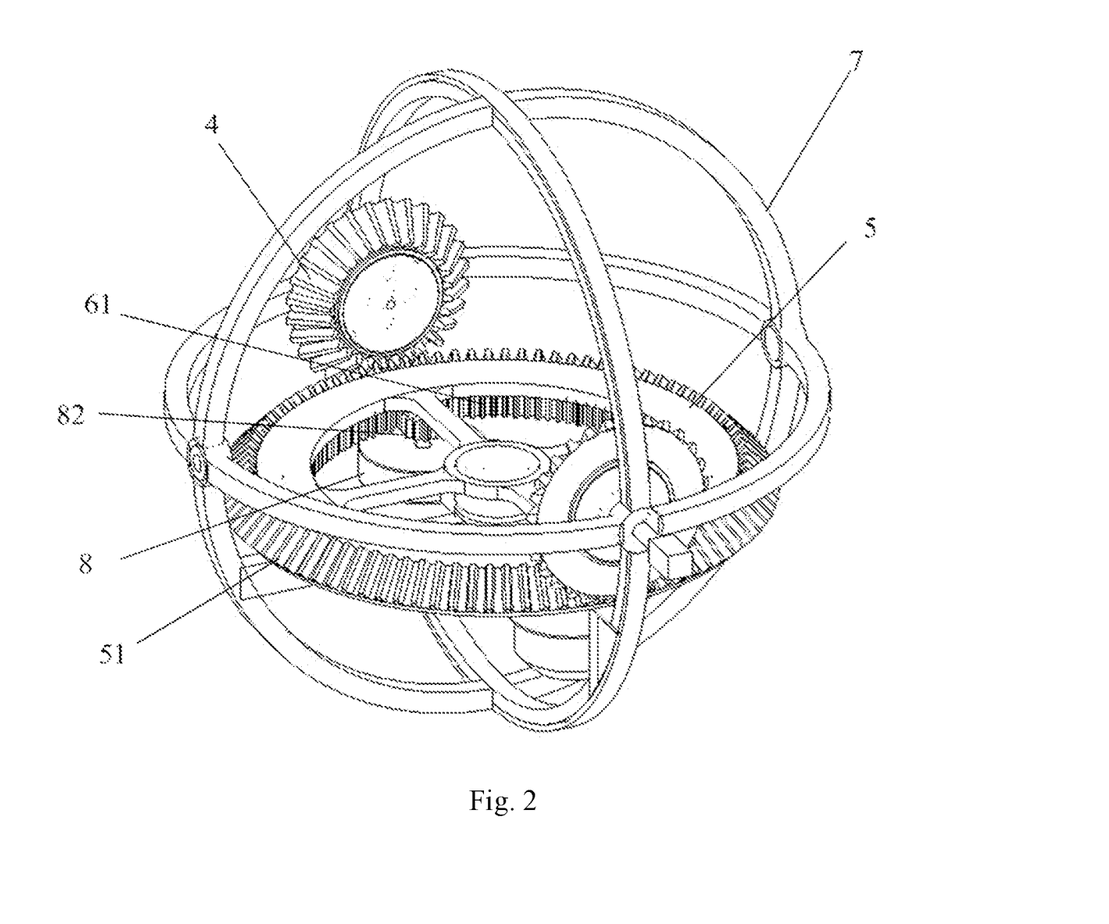
FIG. 2 is a structural view of the internal structure of the ball buoy according to Embodiment 1 of the present application.
Figure 3:
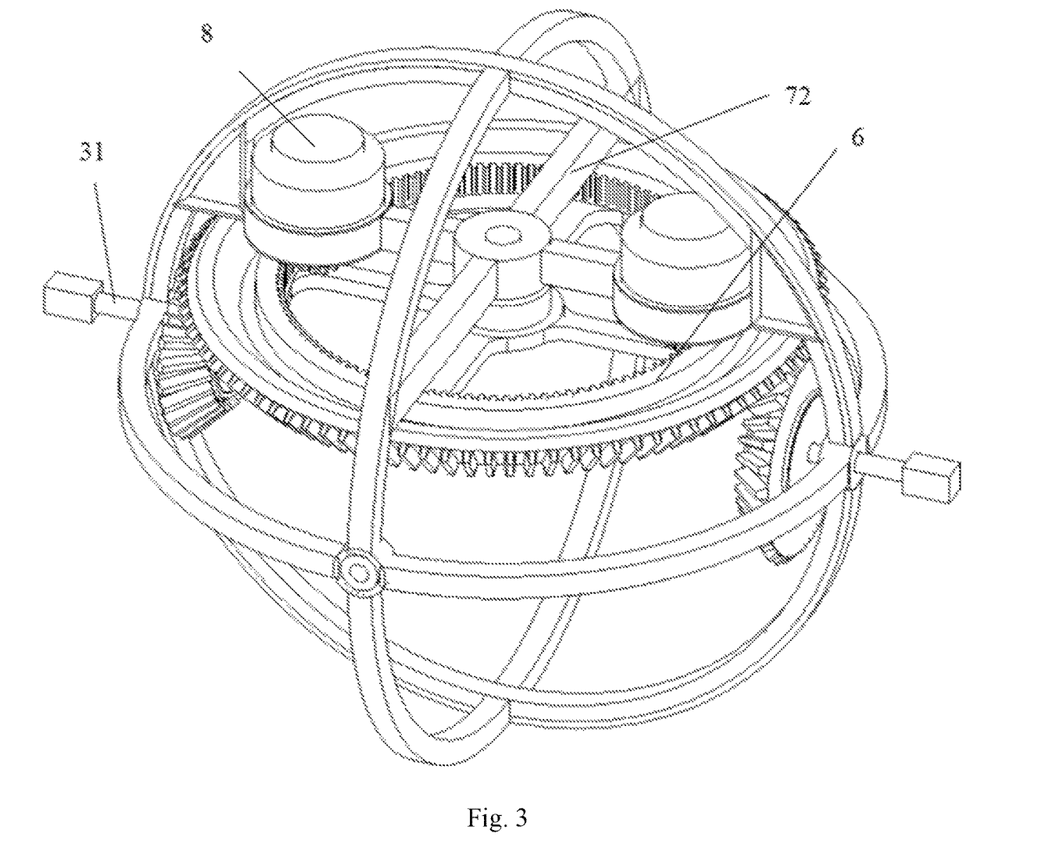
FIG. 3 is another structural view of the internal structure of the ball buoy according to Embodiment 1 of the present application.
Figure 4:
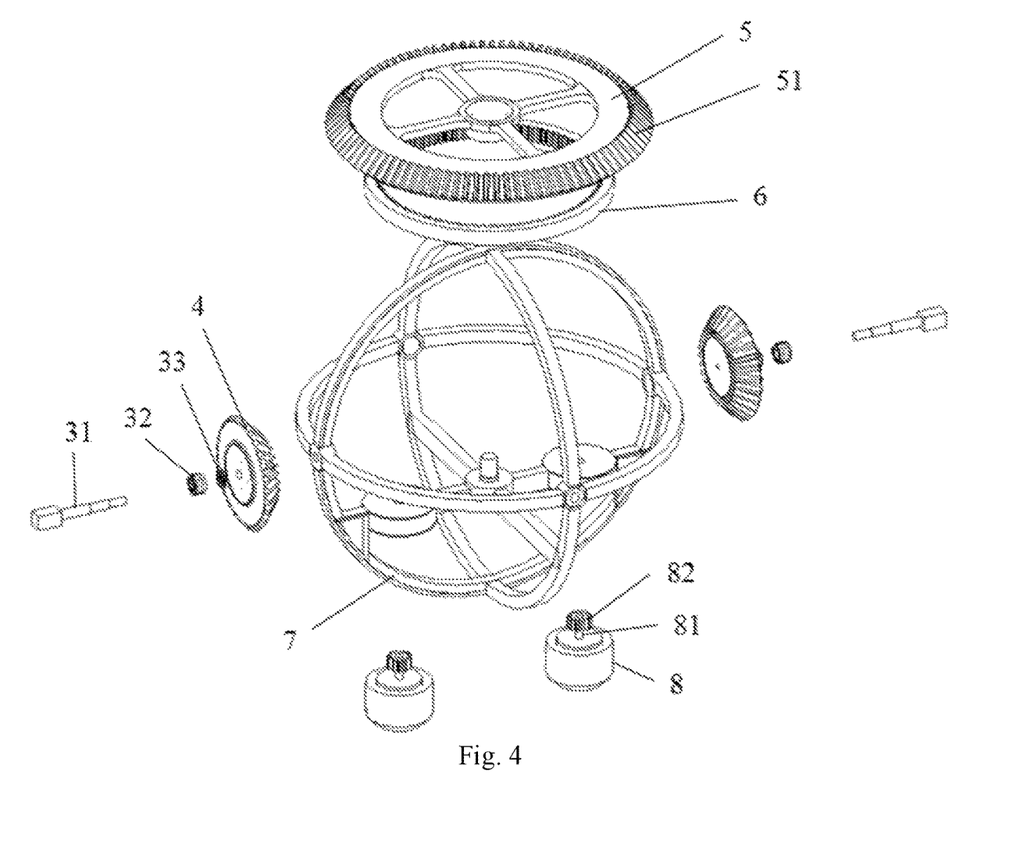
FIG. 4 is an exploded view of the internal structure of the ball buoy according to Embodiment 1 of the present application.

As shown in FIGS. 2-4, the ball buoy 1 includes a casing, flywheels 4, a driven wheel 5, a driven wheel internal gear 6, a spherical frame 7 and a generator 8. The casing has a spherical shape, which helps to withstand impact force of sea waves evenly. The flywheels 4, the driven wheel 5, the driven wheel internal gear 6, and the spherical frame 7 are located inside the casing.

Figure 5:
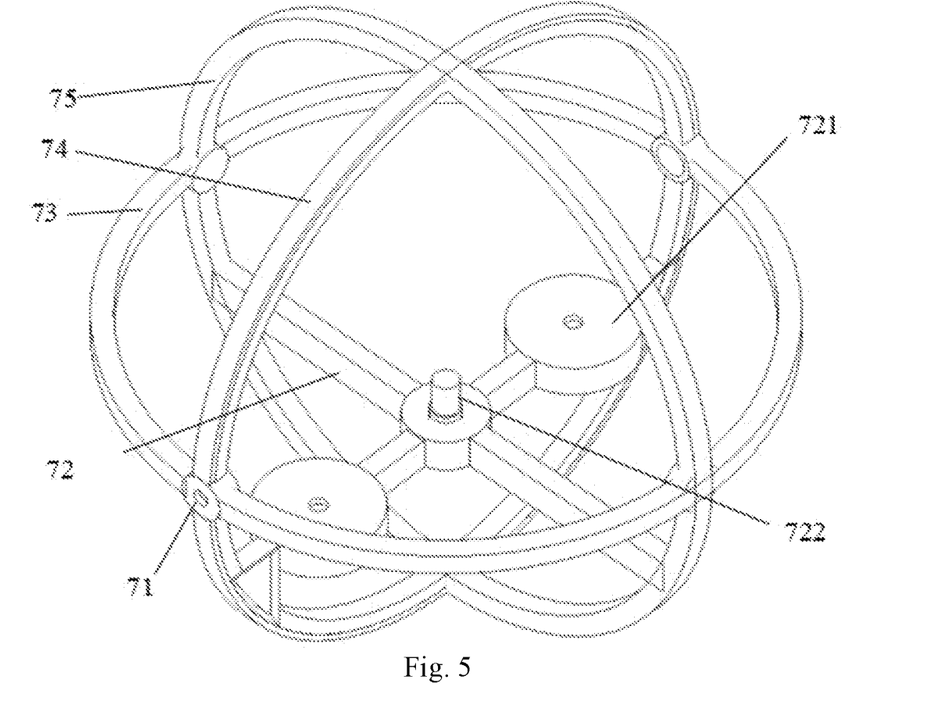
FIG. 5 is a structural view of the spherical frame according to Embodiment 1 of the present application.

As shown in FIG. 5, the spherical frame 7 is fixed in the casing and is composed of a first ring 73, a second ring 74, and a third ring 75. The first ring 73 is placed along a horizontal direction, the second ring 74 and the third ring 75 are paced along a vertical direction, and the first ring 73, the second ring 74 and the third ring 75 are perpendicular to each other. The outer diameter of the three rings is the same as the inner diameter of the casing in order to increase the rigidity of the casing. The second ring 74 and the third ring 75 are both provided with a transverse beam, and the two transverse beams are combined to form a crossed fixed frame 72. A driven wheel mounting base 722 is correspondingly provided on the center of the fixed frame 72, two generator mounting bases 721 are provided on one of the transverse beams, and the generator mounting bases 721 are located on both sides of the driven wheel mounting base 722. In this embodiment, a bearing hole 71 is provided at each joint of the first ring 73 and the second ring 74.

Figure 6:
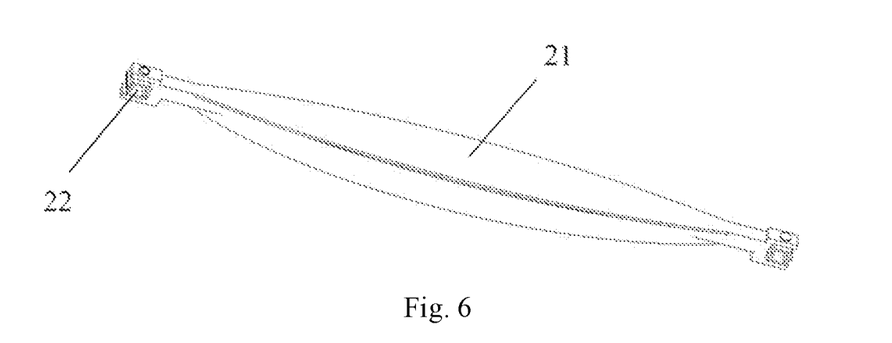
FIG. 6 is a structural view of the connecting rod according to Embodiment 1 of the present application.

As shown in FIG. 6, the rod body 21 of the connecting rod 2 has a boat shape, that is, the width gradually increases from the end portions to the middle portion, and the cross section gradually narrows from top to bottom, and the bottom of the cross section is arc-shaped to reduce the impact of waves. Square holes 22 are provided at both ends of the connecting rods 2.

Figure 7:
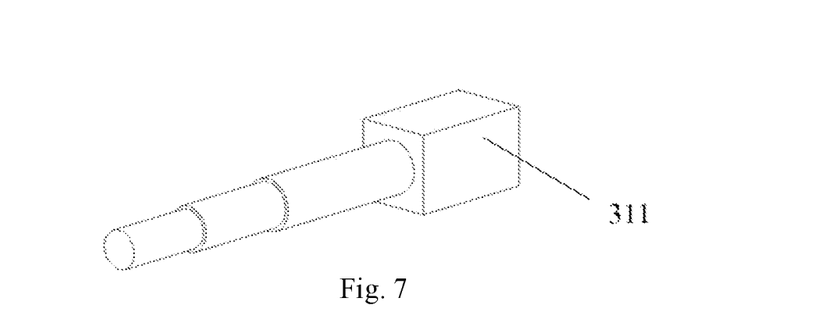
FIG. 7 is a structural view of the flywheel according to Embodiment 1 of the present application.

The rotating shaft 3 includes a flywheel shaft 31, a flywheel bearing 32 sleeved on the flywheel shaft 31, and a flywheel bearing cover 33. The flywheel bearing 32 is fixed on the casing, and is located in the bearing hole 71. The flywheel 4 and the connecting rod 2 are respectively fixed on two ends of the flywheel shaft 31. Specifically, as shown in FIG. 7, the flywheel shaft 31 is provided with a square column 311 at one end corresponding to the connecting rod 2, and the square column 311 is fitted to and passes through the square hole 22 at the end portion of the connecting rod 2, and is fixed by screws. The other end of the flywheel shaft 31 is connected to the center of the flywheel 4 to drive the flywheel 4 to rotate vertically through a transmission.

Figure 8:
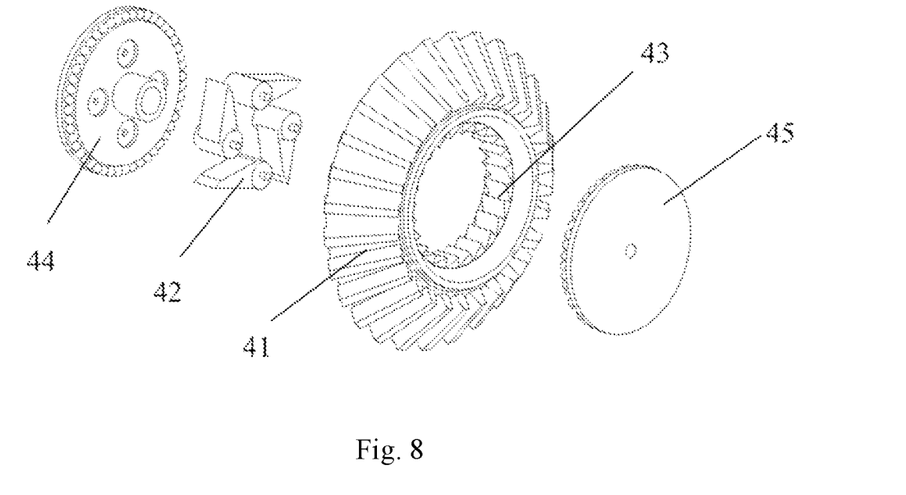
FIG. 8 is an exploded view of the flywheel according to Embodiment 1 of the present application.

As shown in FIG. 8, the flywheels 4 have a conical shape, an conical surface of the flywheels 4 is provided with flywheel teeth 41, and the angle between the conical surface and the axis of the flywheels 4 is 45° (namely, the angle between the flywheel teeth 41 and the axis of the flywheels 4 is 45°). A pawl 42 and a ratchet 43 are located inside the flywheels 4. The flywheels 4 realize unidirectional rotation through the pawl 42 and the ratchet 43. Specifically, the flywheels 4 have hollow cone-shaped structure, a flywheel lower cover 44 and a flywheel upper cover 45 are disposed corresponding to a bottom part and a top part of each of the flywheels 4 respectively. The ratchet 43 is arranged on an inner wall of the flywheel 4, and the pawl 42 are arranged on the flywheel lower cover 44, and the end of the flywheel shaft 31 is fixedly connected to the center of the flywheel lower cover 44. When the pawl 42 is rotated forward, the pawl 42 engages with the ratchet 43 and drives the flywheel 4 to rotate as a whole; when the pawl 42 is rotated in a reverse direction, the pawl 42 is detached from the ratchet 43, and only the pawl 42 is rotated, thus ensuring the flywheels 4 are rotated in a single direction. In this embodiment, the number of the flywheels 4 is two, and the flywheels 4 are located on opposite sides inside the casing, and are each connected to the connecting rod 2 on a corresponding side through the flywheel shaft 31 of the rotating shaft 3.

Figure 9:
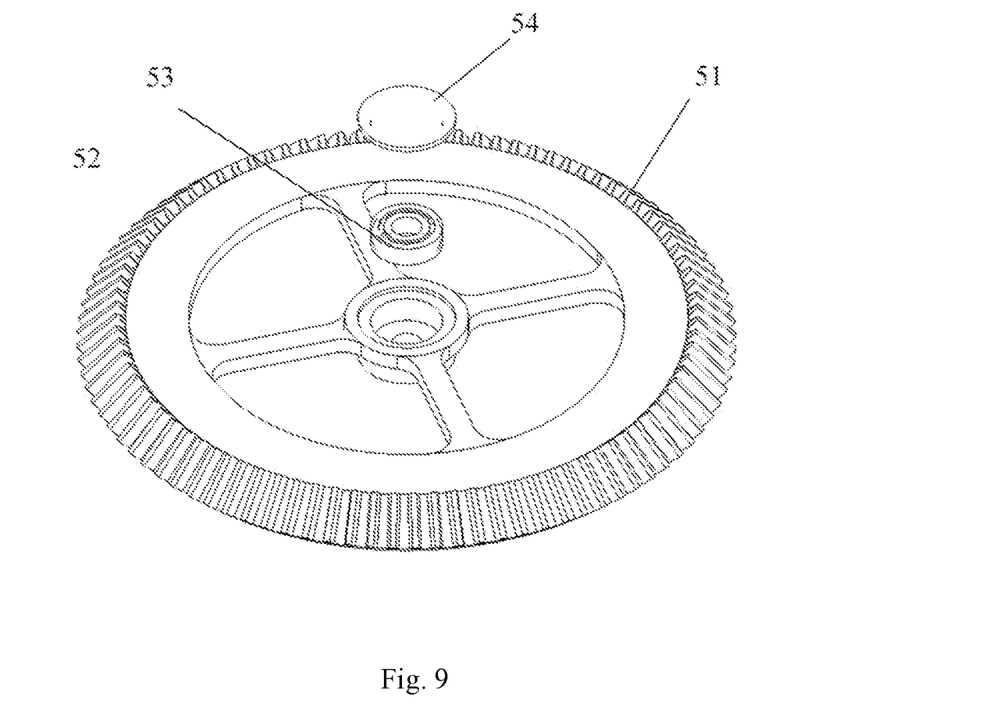
FIG. 9 is a structural view of the driven wheel according to Embodiment 1 of the present application.

As shown in FIG. 9, the driven wheel is provided with a mounting hole 52, a driven wheel bearing 53 and a bearing cover 54 at the center, and the driven wheel bearing 53 is positioned in the mounting hole 52. The driven wheel bearing 53 is fixedly mounted on the driven wheel mounting base 722. An outer surface of the driven wheel 5 is a conical surface, the angle between the conical surface and the axis of the driven wheel 5 is 45°, and external teeth 51 is provided on the outer surface (the angle between the external teeth 51 and the axis of the driven wheel 5 is 45°). The external teeth 51 are engaged with the flywheel teeth 41, so that the driven wheel 5 is rotated horizontally by the driving force of the flywheels 4.

Figure 10:
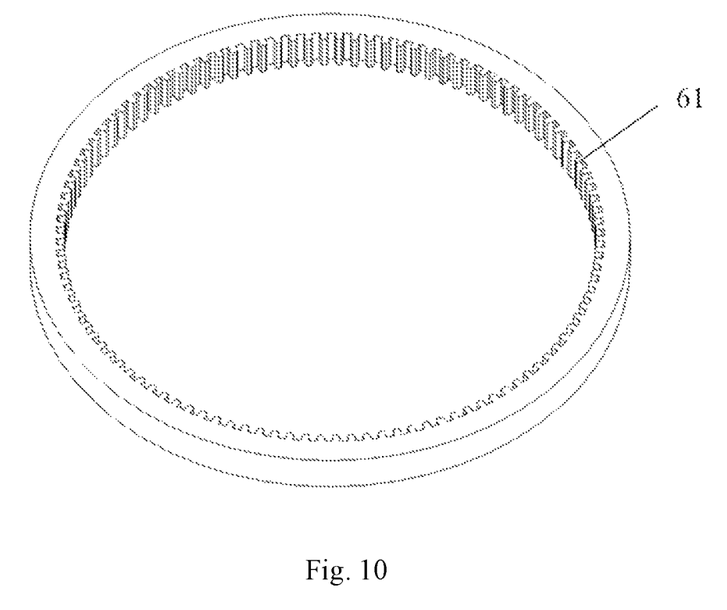
FIG. 10 is a structural view of the inner gear according to Embodiment 1 of the present application.

As shown in FIG. 10, the driven wheel internal gear is an annular gear with internal teeth 61 provided on an inner surface thereof. The driven wheel internal gear 6 is fixed on the driven wheel 5 and is rotated horizontally in accordance with the driven wheel 5. It should be noted that the driven wheel 5 and the driven wheel internal gear 6 may be fixed by sleeve fitting, snapping or welding, or may be integrally formed into a transmission wheel to achieve synchronous rotation.

Figure 11:
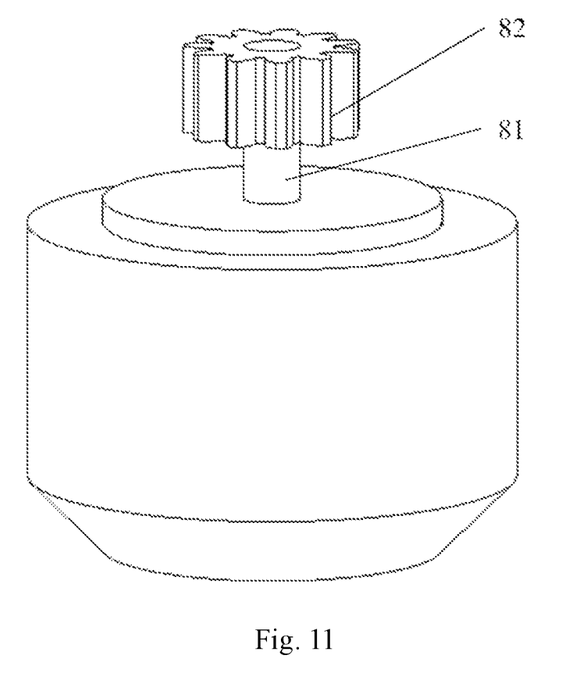
FIG. 11 is a structural view of the generator according to Embodiment 1 of the present application.

As shown in FIG. 11, in the present embodiment, the number of generators 8 is two, which are fixed on generator mounting bases 721. A generator gear 82 is provided on the rotatory shaft 81 of each of the generators 8, and the generator gear 82 is engaged with the internal teeth 61.

Further, a ball buoy 1 is connected to each end of the connecting rod 2.

The generator device using potential energy with two connecting rods of the present application can be placed in the sea, and the connecting rod 2 is rotated relative to the ball buoy 1 around the rotating shaft 3 when an end of the connecting rod 2 away from the ball buoy 1 undulates with the waves, and the flywheel 4 is driven to rotate in one direction through the rotating shaft 3, thereby driving the driven wheel 5, the driven wheel internal gear 6, and then the generators 8 to rotate to generate electricity. Moreover, the two connecting rods 2 may both provide driving force for the generators 8 to rotate, ensuring that electricity is continuously generated by the generator 8. In addition, the rotation direction of the driven wheel 5 driven by the two connecting rods 2 through the flywheels 4 is the same, so that any one of the connecting rods 2 may provide the driving force to the driven wheel 5 through the flywheel 4 to generate power.

Embodiment 2

Figure 12:
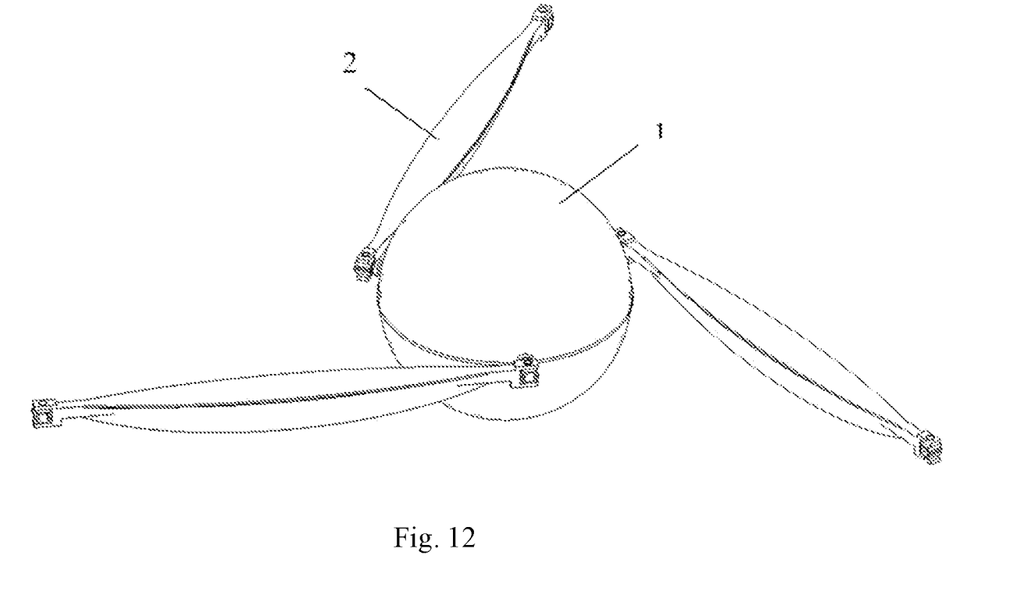
FIG. 12 is a structural view of the generator device using potential energy with three connecting rods according to Embodiment 2 of the present application.
Figure 13:
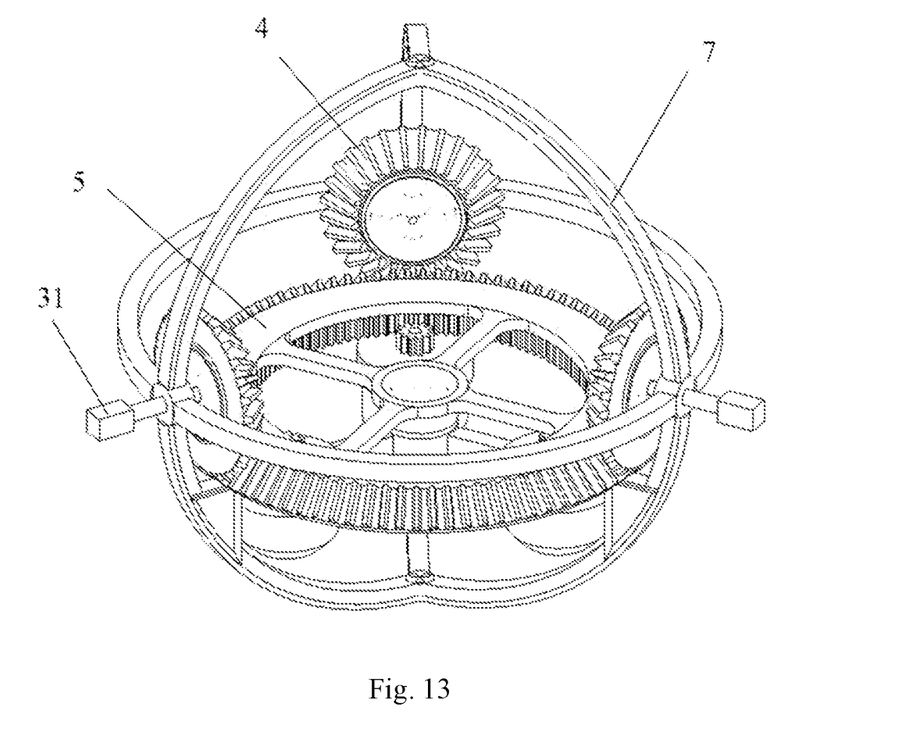
FIG. 13 is a structural view of the internal structure of the ball buoy according to Embodiment 2 of the present application.
Figure 14:
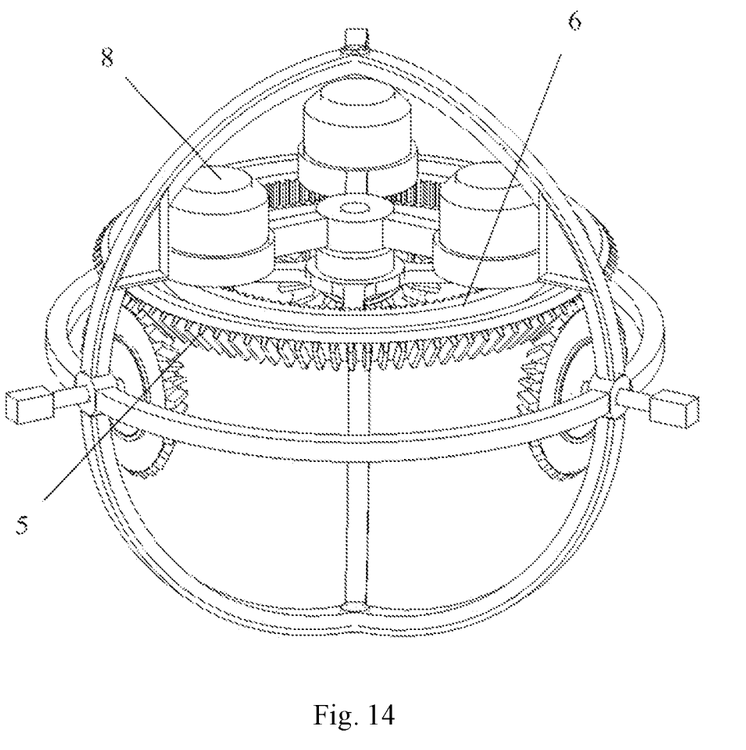
FIG. 14 is another structural view of the internal structure of the ball buoy according to Embodiment 2 of the present application.

As shown in FIGS. 12-14, differences between the generator device using potential energy with three connecting rods of the present embodiment and the generator device with two connecting rods of Embodiment 1 are that, in the present embodiment, the ball buoy 1 is provided with three connecting rods 2 and three flywheels 4 inside thereof corresponding to each connecting rod 2. Each connecting rod 2 and the corresponding flywheel 4 are connected by a rotating shaft 3, and the rotating shafts 3 are evenly distributed on the same surface in a radial direction of the ball buoy 1, that is, an angle between two adjacent rotating shafts 3 towards the center of the ball buoy 1 is 120°, and each flywheel 4 is engaged with the driven wheel 5. In addition, the spherical frame 7 in the present embodiment consists of a horizontal circular ring and three semicircular rings with a common vertex, and each semicircular ring is perpendicular to the horizontal circular ring. Furthermore, in the present embodiment, three generators 8 are arranged inside the ball buoy and are fixed on the fixed frame, and the generator gears 82 of the generators 8 are engaged with the internal teeth of the driven wheel internal gear 6. The structure of other components is the same as that of the generator device of the Embodiment 1.

Embodiment 3

Figure 15:
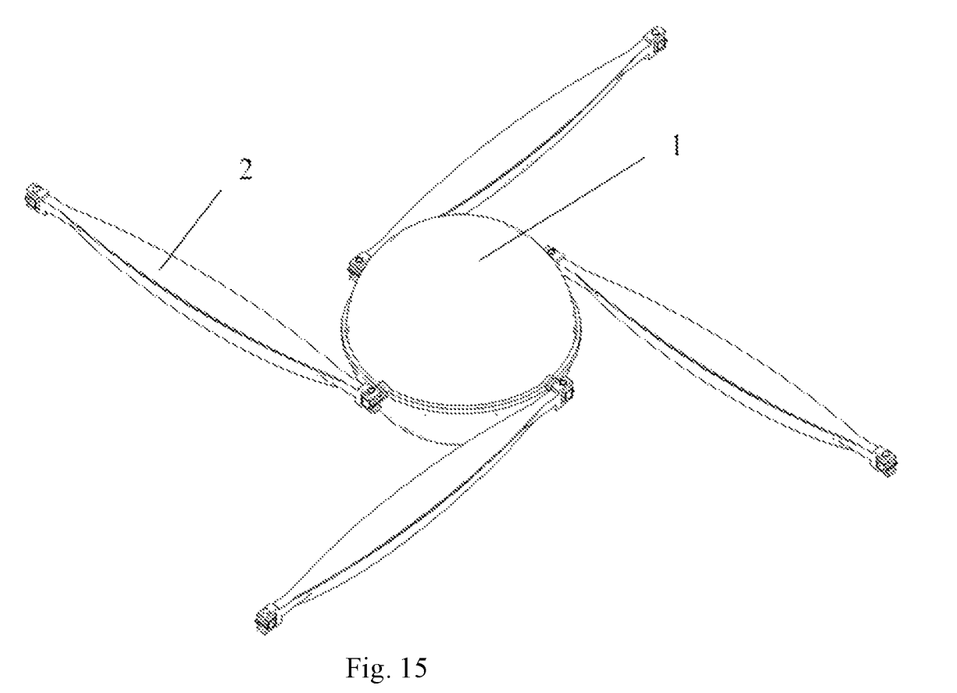
FIG. 15 is a structural view of the generator device using potential energy with four connecting rods according to Embodiment 3 of the present application.
Figure 16:
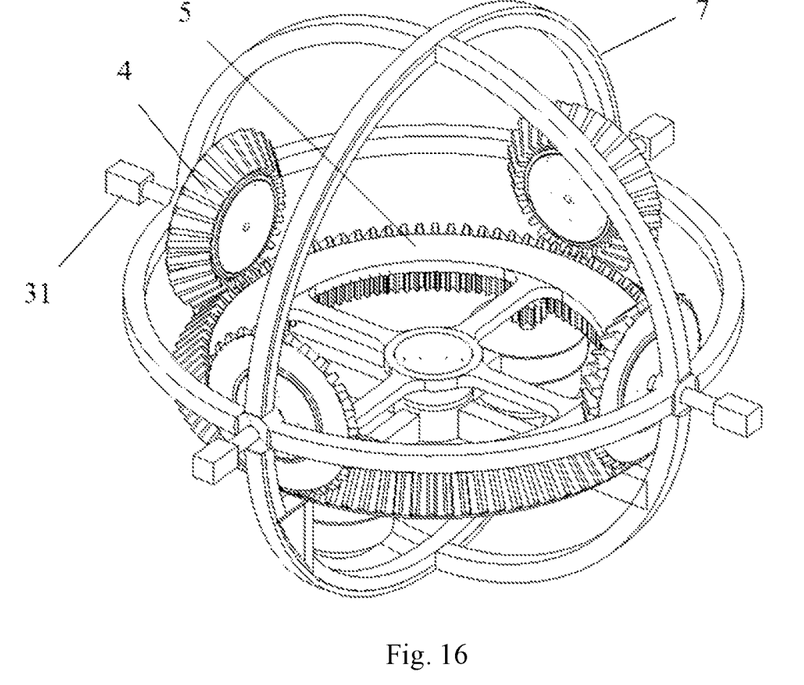
FIG. 16 is a structural view of the internal structure of the ball buoy according to Embodiment 3 of the present application.
Figure 17:
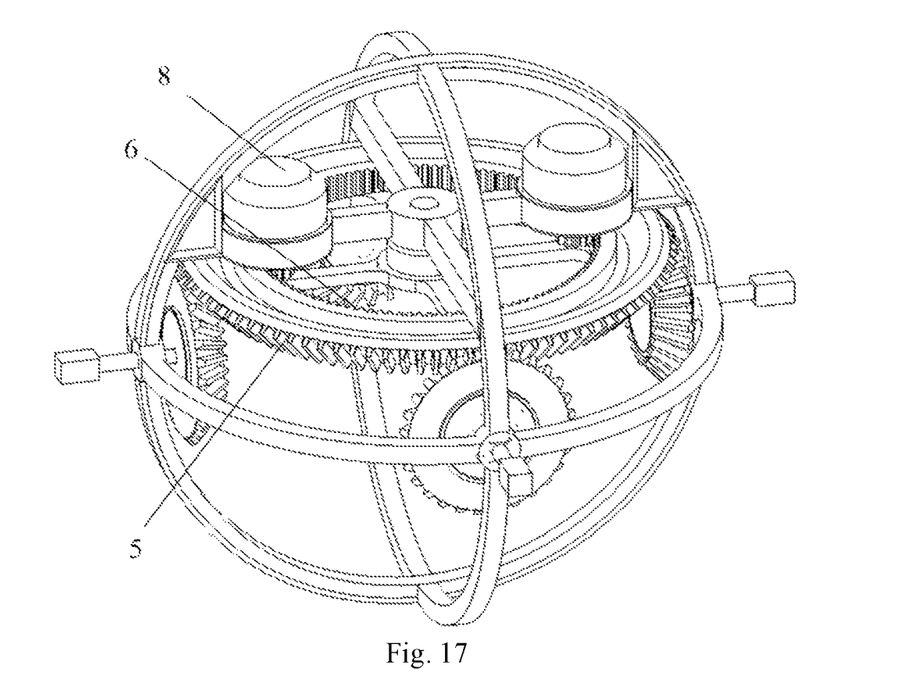
FIG. 17 is another structural view of the internal structure of the ball buoy according to Embodiment 3 of the present application.

As shown in FIGS. 15-17, differences between the generator device using potential energy with four connecting rods of the present embodiment and the generator device with two connecting rods of Embodiment 1 are that, in the present embodiment, the ball buoy 1 is provided with four connecting rods 2 that are arranged in the same plane. Four flywheels 4 respectively corresponding to each connecting rod 2 are arranged inside the ball buoy 1. Each connecting rod 2 and the corresponding flywheel 4 are connected by a rotating shaft 3, and the rotating shafts 3 are evenly distributed on the same surface in a radial direction of the ball buoy 1, that is, an angle between two adjacent rotating shafts 3 towards the center of the ball buoy 1 is 90°, and each flywheel 4 is engaged with the driven wheel 5. The structure of other components is the same as that of the generator device of the Embodiment 1.

The above are merely examples of the present application, but are not intended to limit the scope of this application. Various equivalent changes or substitutions may be made within the technical scope disclosed in the present application by those skilled in the art, and these changes or substitutions shall fall within the scope of the present application. The scope of protection of this application is defined by the appended claims.

What is claimed is:

1. A generator device using potential energy, comprising:
   a ball buoy; and
   connecting rods,
   wherein the ball buoy comprises a casing, flywheels, a transmission gear and generators, the flywheel, the transmission gear and the generators are located inside the casing, a generator gear is provided on a rotary shaft of each of the generators, the transmission gear is provided with external teeth and internal teeth, and the generator gear is in engagement with the internal teeth, and the flywheels are in engagement with the external teeth, the connecting rods are connected with the flywheels inside the casing through rotating shafts arranged on the casing, and the flywheels are driven to rotate in one direction by the connecting rods through the rotating shafts.

2. The generator device using potential energy according to claim 1,
   wherein the transmission gear comprises a driven wheel and a driven wheel internal gear fixed on the driven wheel, the external teeth are provided on the driven wheel, and the internal teeth are provided on the driven wheel internal gear.

3. The generator device using potential energy according to claim 2,
   wherein the rotating shaft comprises a flywheel bearing and a flywheel shaft, the flywheel bearing is fixed on the casing and sleeved on the flywheel shaft, each of the flywheels and the connecting rods are respectively fixed on two ends of the flywheel shaft.

4. The generator device using potential energy according to claim 3,
   wherein the casing has a spherical shape.

5. The generator device using potential energy according to claim 4,
   wherein a spherical frame is located inside the casing, the spherical frame is formed by a plurality of circular or semicircular rings, and an outer diameter of the circular or semicircular rings is the same as an inner diameter of the casing.

6. The generator device using potential energy according to claim 5,
   wherein a fixed frame is provided on the spherical frame, and the transmission gear and the generators are arranged on the fixed frame.

7. The generator device using potential energy according to claim 6,
   wherein the number of the generators is at least two.

8. The generator device using potential energy according to claim 7,
   wherein the number of the connecting rods is at least two, and each of the connecting rods corresponds to each of the flywheels engaged with the external teeth.

9. The generator device using potential energy according to claim 8,
   wherein the number of the connecting rods is three or four.

10. The generator device using potential energy according to claim 1,
    wherein both ends of the connecting rods are connected with the ball buoy.

11. The generator device using potential energy according to claim 2,
    wherein both ends of the connecting rods are connected with the ball buoy.

12. The generator device using potential energy according to claim 3,
    wherein both ends of the connecting rods are connected with the ball buoy.

13. The generator device using potential energy according to claim 4,
    wherein both ends of the connecting rods are connected with the ball buoy.

14. The generator device using potential energy according to claim 5,
    wherein both ends of the connecting rods are connected with the ball buoy.

15. The generator device using potential energy according to claim 6,
    wherein both ends of the connecting rods are connected with the ball buoy.

16. The generator device using potential energy according to claim 7,
    wherein both ends of the connecting rods are connected with the ball buoy.

17. The generator device using potential energy according to claim 8,
wherein both ends of the connecting rods are connected with the ball buoy.

18. The generator device using potential energy according to claim 9,
wherein both ends of the connecting rods are connected with the ball buoy.

\* \* \* \* \*